(No Model.)
H. F. KUHLMANN.
SPLIT PULLEY.
No. 513,118. Patented Jan. 23, 1894.
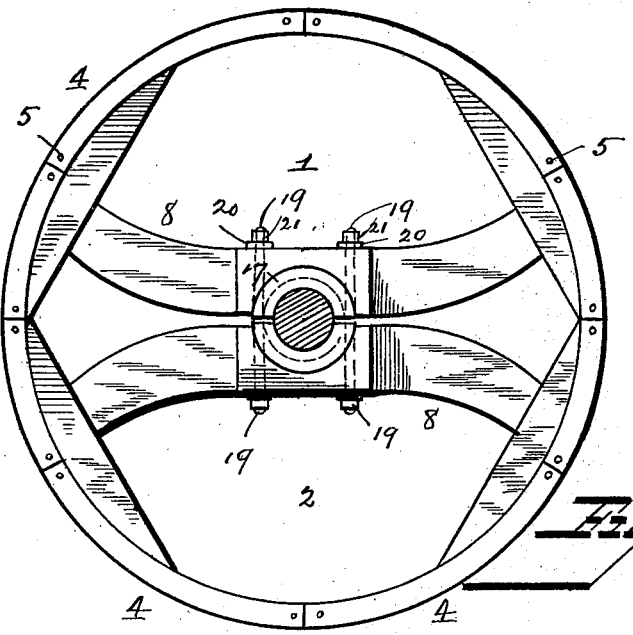
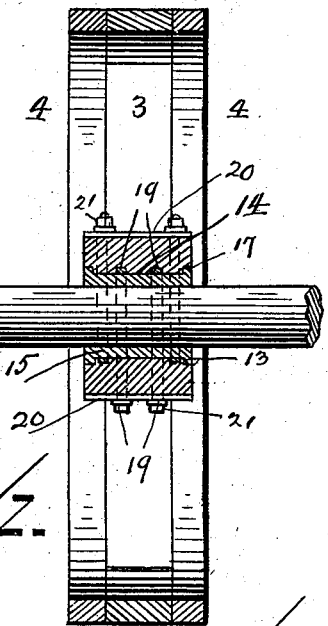
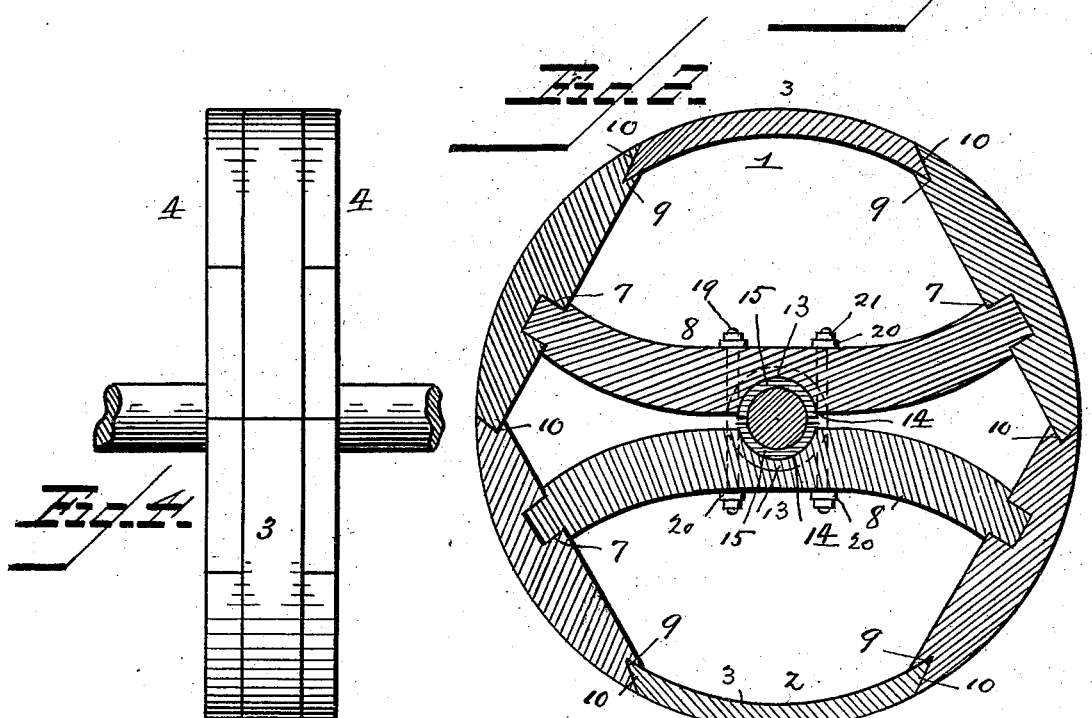
WITNESSES:
F. L. Ourand
Jos. L. Coombs
INVENTOR:
HENRY F. KUHLMANN,
by Louis Bagger & Co
Attorneys

UNITED STATES PATENT OFFICE.

HENRY FREDERICK KUHLMANN, OF INDIANAPOLIS, INDIANA, ASSIGNOR, BY DIRECT AND MESNE ASSIGNMENTS, TO ELENORE KUHLMANN AND JESSIE R. BARTH, OF SAME PLACE.

SPLIT PULLEY.

SPECIFICATION forming part of Letters Patent No. 513,118, dated January 23, 1894.

Application filed May 8, 1893. Serial No. 473,478. (No model.)

*To all whom it may concern:*

Be it known that I, HENRY FREDERICK KUHLMANN, a citizen of the United States, and a resident of Indianapolis, in the county of Marion and State of Indiana, have invented certain new and useful Improvements in Split Pulleys; and I do hereby declare that the following is a full, clear, and exact description of the invention, which will enable others skilled in the art to which it appertains to make and use the same, reference being had to the accompanying drawings, which form a part of this specification.

My invention relates to improvements in split pulleys in which the rim is composed of two sections, each of which is made up of a series of outer and central or intermediate segments, means being provided for securely connecting the said sections together.

The invention consists in the novel construction and combination of parts, hereinafter fully described, and specifically pointed out in the claim.

In the accompanying drawings: Figure 1 is a side elevation of a pulley constructed in accordance with my invention. Fig. 2 is a central longitudinal section of the same. Fig. 3 is a central transverse section. Fig. 4 is a face view.

In the said drawings, the pulley is shown as being made in two sections 1 and 2, each composed of a series of inner wooden segments 3 and outer segments 4, arranged so as to break joints, and secured together by means of nails 5, or other fastening devices. The segments 3, which adjoin each other when the sections are placed together are provided with recesses 7, to receive the arms 8.

As shown in the drawings each section comprises three segments 3, the inner or central one of which has its ends beveled forming tongues 9, which engage with corresponding grooves 10 in the other or outer segments, thus making a tongue and groove joint. The opposite ends of the outer or last mentioned segments of one section are formed with similar tongues 9, which engage with corresponding grooves in the adjoining segments of the other section when said sections are joined together. The outer segments 4 are simply curved pieces of wood, and when the segments are all secured together and the sections connected with each other, they form the rim of the pulley. The arms 8, which fit in the recesses 7, are curved or made in the form of segments, thus insuring great strength, and at their centers are formed with semi-circular recesses 14 in which fit two metal half-boxes 15, which form the bearing for the shaft 16. These half boxes, at their ends are provided with flanges 17, which fit in grooves 13, formed in the faces or outer sides of the arms.

The arms 8 are formed with apertures, through which pass the ends of clips 19, which embrace the half boxes 15. These ends pass through plates 20, and are screw-threaded to receive the retaining nuts 21.

The manner of constructing the pulley will be readily understood. The segments comprising the two sections are secured together with the ends of the arms 8 fitting in the recesses in the extensions of the segments 3. The two sections are then placed together with the shaft 16 embraced by the half boxes 15, and the clips 19 passing around the latter. As will be seen, the beveled meeting ends of the segments of one section, will engage with the beveled grooves in the adjoining segments of the other sections forming an overlapping joint. The clips are then tightened by means of the nuts and the two sections firmly connected together and secured to the shaft.

Having thus described my invention, what I claim is—

In a split pulley made in two sections, the combination with the inner segments having recesses therein and connected together by tongue and groove joints, and the outer segments secured to said inner segments, of the segment arms, the ends of which fit in said recesses, formed with semi-circular recesses at their centers and with grooves in their outer sides, the half-boxes having flanges at their ends fitting in the grooves in said arms, the clips passing through apertures in the arms, the plates through which said clips also pass, and the securing nuts, substantially as described.

In testimony that I claim the foregoing as my own I have hereunto affixed my signature in presence of two witnesses.

HENRY FREDERICK KUHLMANN.

Witnesses:
ALBERT B. COLE,
C. HENRY ROSEBROCK.